June 22, 1965              H. STEUER              3,190,136
AUTOMATIC BELT OR CHAIN TIGHTENING MECHANISM
FOR AN INFINITELY VARIABLE CONE
PULLEY TRANSMISSION
Filed Oct. 25, 1963                           2 Sheets-Sheet 1
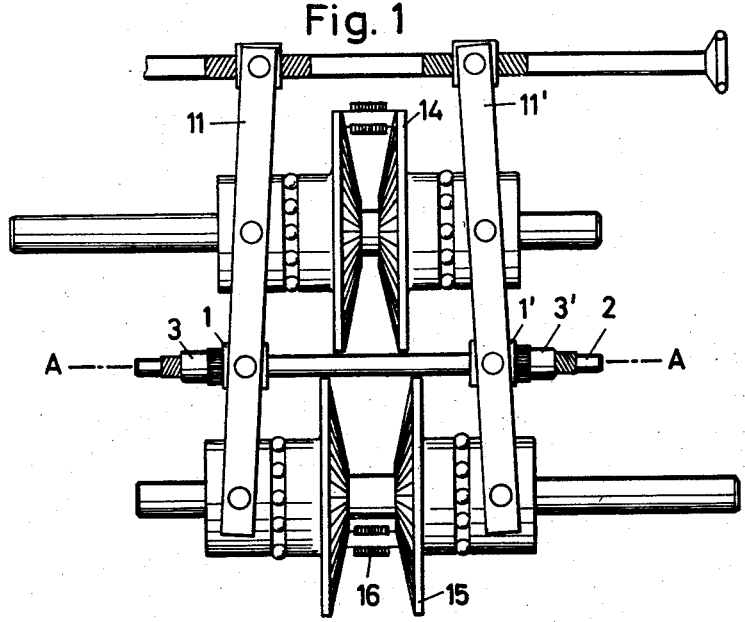
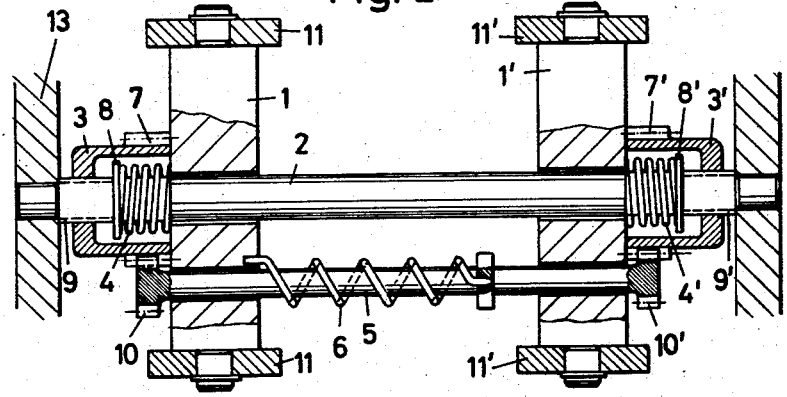
INVENTOR.
HERBERT STEUER
BY
ATTORNEYS June 22, 1965

H. STEUER 3,190,136

AUTOMATIC BELT OR CHAIN TIGHTENING MECHANISM
FOR AN INFINITELY VARIABLE CONE
PULLEY TRANSMISSION

Filed Oct. 25, 1963

INVENTOR.
HERBERT STEUER
BY
Bailey, Stephens &
Huettig
ATTORNEYS

United States Patent Office 3,190,136
Patented June 22, 1965

3,190,136
AUTOMATIC BELT OR CHAIN TIGHTENING MECHANISM FOR AN INFINITELY VARIABLE CONE PULLEY TRANSMISSION
Herbert Steuer, Bad Homburg vor der Höhe, Germany, assignor to Reimers-Getriebe KG., Ascona, Switzerland
Filed Oct. 25, 1963, Ser. No. 319,013
Claims priority, application Germany, Nov. 13, 1962, R 33,867
12 Claims. (Cl. 74—230.17)

The present invention relates to a mechanism for automatically tightening the endless driving element such as a belt or link chain of an infinitely variable cone pulley transmission by means of a tightening spindle which is mounted between the transmission shafts and provided with right and left-hand screw threads, whereby the driving element running between two pairs of conical pulley disks may be tightened by reducing the distance between two tension blocks which are mounted on this spindle and carry control levers which are pivotably mounted thereon and are adapted to shift the conical disks of each pair in opposite axial directions and also to vary the distance between the conical disks of both pairs in the same direction when the distance between the two tension blocks is being changed.

In infinitely variable cone pulley transmissions of this type it is necessary in order to avoid a faulty operation of the transmission as well as the possibility of serious damage to maintain the endless driving element at a uniform tension during the entire length of service of the transmission. If the tension of the driving element is too high, very high internal friction losses result which may lead to a destruction of the driving element and also of the conical pulley disks between which this driving element is running. If, on the other hand, the tension of the driving element is too low, not only the wear increases upon the driving element and its individual links and also upon the conical disks, but also the desired speed ratio of the transmission will no longer be maintained. The last-mentioned case that the driving element is not sufficiently tight occurs very frequently in such infinitely variable cone pulley transmissions in which the driving element must be adjusted to its proper tension by hand. The unavoidable wear on the elements of such a transmission which occurs during its operation, and especially the increase in length and the reduction in width of the driving element result in a reduction of its original tension, that is, the tension of the driving element to which it was adjusted at the time of its installation.

For these reasons it becomes necessary from time to time to readjust the tightening means which are usually provided in such transmissions. Such readjustments are, however, often forgotten or they are omitted because such transmissions are in many cases mounted in inaccessible positions in larger machines. There are many other reasons why the required readjustments are frequently not carried out when due. In very series cases, the driving element may become so loose that it may engage with other parts of the transmission and damage the same.

In order to overcome these disadvantages, it has already been proposed to exert a continuous torque upon the tightening spindle for the purpose of increasing the tension of the driving element. This torque may be produced, for example, by a torsion spring or by a tension spring which acts upon a lever which is secured to the tightening spindle so as to turn the tightening spindle when the tension of the driving element decreases so that by means of right and left-hand threads on the tightening spindle the control levers which are carried on this spindle will be adjusted in such a manner that the distance between the conical disks of each pair will be reduced. The intended purpose of such a mechanism is therefore to turn the tightening spindle for maintaining the tension of the driving element to such a extent, and thereby to move the conical disks of both pairs so far toward each other that the wear upon the driving element will again be compensated.

The actual practice has, however, shown that none of these known devices permits the driving element to be accurately readjusted to the required tension. The adjustment of the normally stationary parts depends, on the one hand, upon the spring force and, on the other hand, upon the counteracting frictional resistances. These frictional resistances vary, however, very considerably in accordance with the varying conditions of operation and the differences in load of the transmission. In addition, there are the changes which are caused by the difference between the static friction and the friction which occurs after the adjusting movement has started, by the difference between the original and final tension of the spring, and by the differences in the surface condition of the threaded parts and joints. Because of these variable influences it is necessary to apply a relatively strong spring which may have the result that the driving chain will be tightened too much, especially when stronger vibrations occur in the operation which eliminate the static friction. The tension of the driving element may become too low, for example, due to the fact that the tightening spindle cannot be readjusted to the desired extent because the tension blocks also carry the speed control levers which by their weight and unavoidable tolerances in dimensions always exert a certain tilting action upon the tension blocks, whereby the associated screw threads on the tightening spindle and the tension blocks which likewise are made with certain tolerances become hard to turn relative to each other.

The present invention relates to improvements in a mechanism of the known type for automatically tightening the endless driving element of an infinitely variable cone pulley transmission by means of a tightening spindle which is mounted between the transmission shafts and provided with right and left-hand screw threads, whereby the driving element running between two pairs of conical pulley disks may be tightened by reducing the distance between two tension blocks which are mounted on this spindle and carry control levers which are pivotably mounted thereon and are adapted to shift the conical disks of each pair in opposite axial directions and also to vary the distance between the conical disks of both pairs in the same direction when the distance between the two tension blocks is being changed. In order to overcome the aforementioned disadvantages of such a mechanism, the present invention provides that the tension blocks are slidable on the tightening spindle in the longitudinal direction thereof and are acted upon in the axial direction of the tightening spindle toward each other by springs which tend to tighten the driving elements, while in the opposite direction, that is, away from each other, the tension blocks are braced on their outer sides by clamping nuts which are screwed upon the right and left-hand threads on the tightening spindle. The invention further provides suitable spring means which continuously exert a torque upon the clamping nuts and/or upon the tightening spindle to readjust the clamping nuts in the direction toward the tension blocks when they are moved toward each other to tighten the driving element.

The frictional resistances on the screw threads of the tightening spindle are therefore overcome by dividing the tightening operation into two movements, that is, into the axial movement of the tension blocks which occurs practically without friction and into the retightening movement of the clamping nuts or the tightening spindle, which movement also occurs with very little friction when the transmission runs without a load. When the transmission runs under a load and the wedging action of the driving element then occurs between the conical disks of both pairs which is transmitted by the speed control levers to the tension blocks, the latter are pressed against the clamping nuts on the tightening spindle. When the torque decreases and the wedging action therefore also decreases, and especially as soon as the transmission runs without load and the only wedging action remaining is that which is caused by the weight of the driving element, and when the driving element has become worn and requires a readjustment of its tension, the tension blocks are lifted off the clamping nuts by the force of the springs acting in the axial direction of the tightening spindle. The torque which is acting upon the clamping nuts will then turn the latter until they again engage upon the tension blocks. Since the clamping nuts are easily turned when the tension blocks are lifted therefrom and are then not affected by any other forces, the torque which is continuously exerted thereon in the tightening direction should be made only of such a strength as to overcome the low frictional resistances of the respective clamping nut. Such a relatively weak torque cannot cause an excessive tightening of the driving element but the clamping nuts will thereby be turned only until they reengage with the tension blocks. The springs acting in the axial direction of the tightening spindle also have only such a force that, whenever the transmission is running without a load, the driving element will be readjusted only to the proper tension and this adjustment will then be fixed by the automatic turning of the clamping nuts until they again engage with the tension blocks.

Since in the embodiment as above described the tightening spindle is nonrotatably mounted, it does not have to consist of one continuous element, but instead it is also possible to employ two spindle parts or journals which are provided with equal threads but of an opposite pitch and are nonrotatably secured in the housing of the transmission.

For reasons of a more simple construction it may be desirable to mount the clamping nuts so as to be nonrotatable and the tightening spindle so as to be rotatable, and to apply a torque on the spindle which tends to turn it relative to the nuts in the direction in which it will effect a tightening of the driving element. The result attained by such a construction would, of course, be the same as that of the embodiment as previously described, since also in this case the spring forces which act in the axial direction of the tightening spindle will, when the transmission is not running under a load, produce the best possible tension of the driving element which will then be maintained by the required turn of the tightening spindle, whereby the two clamping nuts with right and left-hand screw threads will move on the tightening spindle toward each other.

It is also possible to exert a torque upon the clamping nut as well as upon the tightening spindle in order to retighten the driving element. Especially in such a transmission in which it is not possible to provide a clamping nut on each side, it may be advisable to provide the tightening spindle near one end with a flange which, through a bearing, engages upon one of the tension blocks, while the tightening mechanism, consisting of a rotatable clamping nut which is acted upon by a torque and of the rotatable tightening spindle which is likewise acted upon by a torque, acts at the opposite end of the tightening spindle upon the other tension block.

The springs which act in the axial direction of the tightening spindle engage at one side upon the tension blocks and at the other side upon abutments which are located outside of the tension blocks. Each of these abutments may be mounted in front of or behind the respective screw thread on the tightening spindle either on the tightening spindle itself or on the housing of the transmission. The arrangement in which the abutments are located in front of the screw threads on the tightening spindle within the respective clamping nut has the advantage that the tightening mechanism takes up very little space. It is therefore suitable especially for a stationary tightening spindle and rotatable clamping nuts. In this case, the clamping nuts are preferably cup-shaped so as to enclose the screw thread on the tightening spindle and thereby protect the same from being soiled or damaged. The arrangement of the abutment behind the screw thread on the tightening spindle, on the other hand, allows more freedom in designing the tightening mechanism and may preferably be applied when the clamping nut is nonrotatable and the tightening spindle is turned for retightening the driving element.

Instead of providing separate springs to act upon the tension blocks, it has also been found advisable to provide at least one tension spring which is secured to both tension blocks and tends to move them toward each other. Such a design of the tightening mechanism according to the invention completely avoids the necessity of providing abutments on the tightening spindle or on the housing of the transmission and may be advantageously applied if, not only the clamping nut, but also the threaded tightening spindle is rotatably mounted.

The torque for turning the clamping nuts or the tightening spindle may be transmitted to them by different means. Thus, for example, one construction which has proved successful consists in rotatably mounting a shaft in the tension blocks and in providing the ends of this shaft with pinions which engage with a gear rim on the clamping nuts, and in providing a torsion spring which acts upon the shaft to exert the required torque thereon.

Such an arrangement results in a uniform load being exerted upon both clamping nuts and in a synchronous turning movement of the latter when the driving element is being retightened. It is thus insured that both clamping nuts, one with right-hand threads and the other with left-hand threads, will always be turned equal amounts and that any axial displacement of the two pairs of conical disks out of alignment with each other will be prevented.

It has further been found to be of advantage to make the screw threads of the clamping nuts and the associated screw threads on the tightening spindle saw-tooth-shaped. Such screw threads are self-locking, and a turning of the clamping nuts or of the tightening spindle is possible only when the transmission is not running under a load. If the tension blocks are pressed by the wedging action of the driving element against the associated clamping nuts, screw threads of this type will prevent the clamping nuts or the tightening spindle from being unintentionally turned back which would result in a decrease of the tension of the driving element which might damage the transmission.

For the same purpose it is possible to provide the contact surfaces of the clamping nuts and the corresponding contact surfaces of the tension blocks with toothlike corrugations or to roughen these surfaces in a suitable manner. The clamping nuts will also in this case be prevented from turning back under the wedging action of the driving element since the corrugations will not permit such a turning while the transmission is running under a load.

The features and advantages of the present invention will become more clearly apparent from the following detailed description of several preferred embodiments of the invention which are illustrated in the accompanying drawings, in which—

FIGURE 1 shows a diagrammatic plan view of a transmission with the tightening means according to the invention;

FIGURE 2 shows a cross section which is taken along line A—A in FIGURE 1;

FIGURE 5 shows a view similar to FIGURE 3 of a further modification of the invention; while FIGURE 6 shows a view which is taken in the direction of the line C—C of FIGURE 5.

Figures 3, 4:
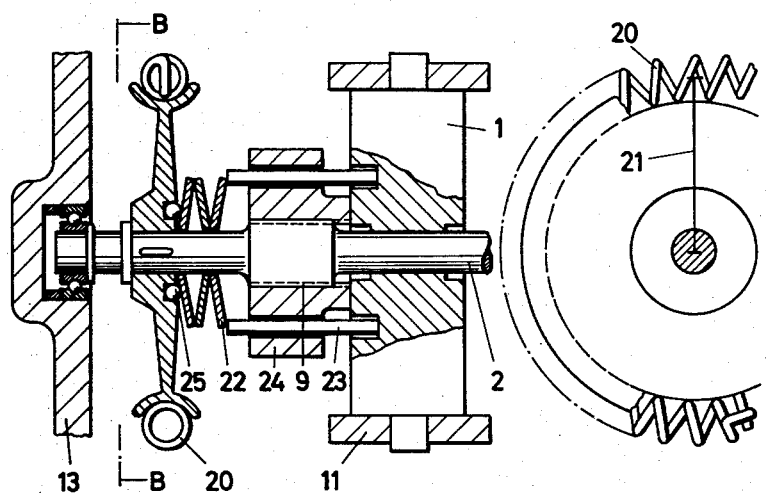
FIGURE 3 shows a partial cross section similar to FIGURE 2 but of a modification of the invention, in which the threaded tightening spindle is turned for retightening.
FIGURE 4 shows a view which is taken in the direction of the line B—B of FIGURE 3.

In the drawings, FIGURE 1 illustrates diagrammatically the type of infinitely variable cone-pulley transmission to which the invention is applicable. It consists essentially of a pair of shafts, either of which may serve as the drive shaft or the driven shaft of the transmission and each of which carries a pair of conical disks 14 or 15. The two pairs of conical disks are connected to each other by an endless driving element 16 such as a belt or chain. For varying the speed ratio of the transmission, the diameters of this driving element 16 between the two pairs of conical disks 14 and 15 may be adjusted relative to each other by decreasing the distance between the conical disks of one pair by a certain amount and by simultaneously increasing the distance between the disks of the other pair by a corresponding amount. This is accomplished by means of two pairs of control levers 11 and 11' which are pivotably mounted on tension blocks 1 and 1' and, through tension rings and thrust ball bearings, act upon the conical disks to set and vary the relative distance of the conical disks of each pair from each other. The adjustment of a desired speed ratio of the transmission is carried out by means of a setting spindle which, when turned, pivots the control levers 11 and 11' in opposite directions about their pivots on the tension blocks 1 and 1'. Thus, when the setting spindle is turned in one direction, the pressure upon the conical disks of one pair, and through them upon the driving element 16, is increased so that the latter moves outwardly between these disks and increases to a certain extent in diameter, while at the same time the driving element 16 moves inwardly between the conical disks of the other pair and decreases to the same extent in diameter by pressing these disks apart for the distance allowed by the outward movement of the associated tension rings. Thus, when the setting spindle is turned in one direction, the speed ratio of the transmission is increased, while when it is turned in the other direction, the speed ratio is decreased.

A proper transmission of the driving power from the drive shaft to the driven shaft and also a proper maintenance of the speed ratio as set, as well as a change of this ratio as desired, require the driving element 16 running between the two pairs of conical disks to have a uniform tension at all times. Since, in the course of time, the length of this driving element necessarily increases as the result of wear, suitable means have to be provided for automatically compensating such increase in length by tightening the driving element 16.

According to the present invention, this is accomplished by providing the tension blocks 1 and 1' with bores extending transverse to the axes of their pivots on which the control levers 11 and 11' are mounted, and by extending through these bores a tightening spindle 2 which is provided near its opposite ends with right or left-hand threads 9, 9', respectively, on which clamping nuts 3, 3' are screwed which bear upon the outer sides of the tension blocks 1 and 1'. The tightening spindle 2 also carries springs 4 and 4' which act in the axial direction of this spindle and each at one end on a fixed supporting member 8 or 8' on spindle 2 and at the other end on the outer side of the associated tension block 1 or 1'. Tension blocks 1 and 1' have each a further bore through which a shaft 5 extends which has rigidly secured to its opposite ends a pair of pinions 10 and 10' which engage with gear rims 7 and 7' on the clamping nuts 3 and 3'. By the provision of a torsion spring 6 which is secured at one end to one of the tension blocks and at the other end to shaft 5, a torque is exerted upon shaft 5 in the direction in which the driving element 16 is tightened in the manner as subsequently described.

When the tension of the driving element 16 decreases, for example, due to wear, and when the transmission runs without load or only under a small load, the two springs 4 and 4' acting in the axial direction of the tightening spindle 2 upon the two tension blocks 1 and 1' press the latter toward each other and thereby tighten the driving element 16 to its original tension. By this movement, the tension blocks 1 and 1' also move away from the original position of the clamping nuts 3 and 3' which are then turned on the screw threads 9 and 9' on spindle 2 by the torque which is exerted by torsion spring 6 through shaft 5, pinions 10 and 10' and gear rims 7 and 7' until these nuts 3 and 3' again engage upon the tension blocks 1 and 1' and their rotary movement is then stopped by the friction of this engagement which, if desired, may be increased by providing the contact surfaces between tension nuts 3, 3' and tension blocks 1 and 1' with tooth-shaped corrugations. In this embodiment of the invention, as shown in FIGURE 2, the tightening spindle 2 is nonrotatably secured in the transmission housing 13.

In the modification of the invention as illustrated in FIGURES 3 and 4, however, the tightening spindle 2 is rotatably mounted in the transmission housing 13 and acted upon by a torque which tends to tighten the driving element 16 by means of a spring 20 which acts upon an arm 21. The pressure which is exerted by a spring 22 in the axial direction is transmitted at one end thereof by pins 23 through bores in the clamping nuts 24 to the tension block 1 while the other end of spring 22 is supported by a bearing 25 on a supporting member carrying the spring 20.

When the tension of the driving element 16 such as a belt or chain decreases and the transmission runs substantially without load, springs 22 will also in this embodiment tighten the driving element 16 by moving the tension blocks 1 and 1' toward each other and will thereby move the tension blocks off the clamping nuts 24. The torque which is produced by spring 20 and acts through the arm 21 upon the tightening spindle 2 will then turn the latter until the clamping nuts 24 again engage with the tension blocks 1 and 1'.

Figures 5, 6:
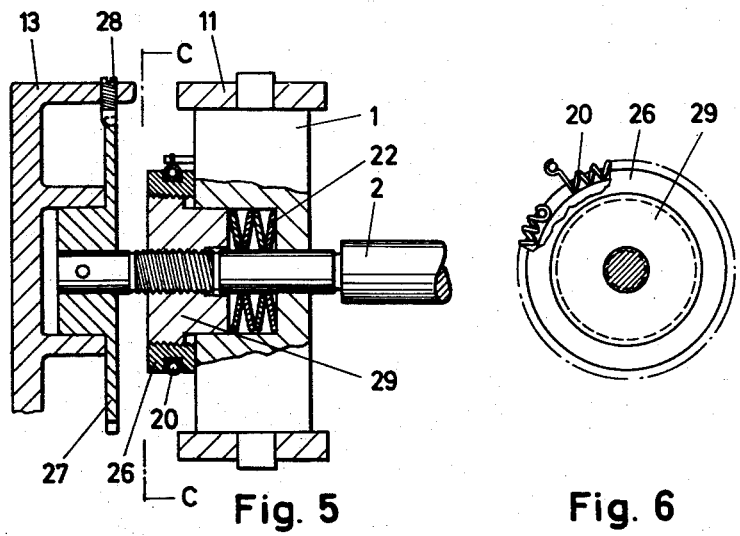

The mode of operation of the tightening mechanism as illustrated in FIGURE 5 is similar to that of the devices as previously described. When the tension of the driving element 16 decreases, for example, due to the wear thereon, and when the transmission runs without load or under a small load, the tension blocks 1 and 1' will be moved toward each other by the action of the springs 22 which are supported on the nuts 29 on the tension spindle 2. The tension blocks 1 and 1' are thereby lifted off the clamping nuts 26. The torque which is produced by springs 20 then turns the clamping nuts 26 until they again engage with the tension blocks 1 and 1'.

The tightening spindle 2 is rigidly connected in a known manner to a slotted disk 27 which is mounted in the housing 13. When the transmission is first installed or after a change of belts or chains, this slotted disk 27 which may be locked in a fixed position, for example, by a setscrew 28, may be used for moving the tension blocks 1 and 1' to such a basic position that the driving element 16 will be adjusted to the required tension.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A mechanism for automatically tightening the endless driving element of an infinitely variable cone pulley transmission having a housing, a drive shaft and a driven shaft rotatably mounted in said housing, a pair of conical pulley disks mounted on each shaft so as to be axially slidable thereon, nonrotatable pressure members axially slidable on each shaft and adapted to press the disks of each pair toward each other, an endless driving element connecting both pairs of disks and adapted to run between them, a tightening spindle mounted centrally between said shafts and having a screw thread near at least one end thereof, a pair of tension blocks disposed coaxially to each other and also forming pivot means, at least the first of said tension blocks being slidable axially on said spindle relative to the second tension block, control levers pivotably connected to the pivot means of said tension blocks and also to the pressure members associated with the corresponding disks of both pairs, means for equally pivoting said levers at the opposite sides of both pairs of disks in opposite directions to each other about said pivot means on said tension blocks, whereby, when said driving element runs between both pairs of disks, the disks of one pair are moved for a certain distance toward each other and the disks of the other pair are moved for the same distance away from each other so that the speed ratio of the transmission is changed, spring means acting upon at least said first tension block in the axial direction of said spindle and tending to move said first tension block toward said second tension block and thus also said lever on the pivot means of said first tension block toward the lever on the pivot means of the second tension block so as to tighten said driving element, a nutlike member screwed on said screw thread of said spindle and adapted to engage with the outer side of said first tension block, and means for continuously producing a torque for turning said nutlike member and said spindle relative to each other so as to move said nutlike member for the distance of the tightening movement of said first tension block caused by said spring means and merely into bracing engagement with the outer side of said first tension block.

2. A mechanism for automatically tightening the endless driving element of an infinitely variable cone-pulley transmission having a housing, a drive shaft and a driven shaft rotatably mounted in said housing, a pair of conical pulley disks mounted on each shaft so as to be axially slidable thereon, nonrotatable pressure members axially slidable on each shaft and adapted to press the disks of each pair toward each other, and endless driving element connecting both pairs of disks and adapted to run between them, a tightening spindle mounted centrally between said shafts and having right-hand and left-hand screw threads near the opposite ends thereof, a pair of tension blocks slidable axially on said spindle and also forming pivot means, control levers pivotably connected to the pivot means of said tension blocks and also to the pressure members associated with the corresponding disks of both pairs, means for equally pivoting said levers at the opposite sides of both pairs of disks in opposite directions to each other about said pivot means on said tension blocks, whereby, when said driving element runs between both pairs of disks, the disks of one pair are moved for a certain distance toward each other and the disks of the other pair are moved for the same distance away from each other so that the speed ratio of the transmission is changed, spring means acting upon said tension blocks in the axial direction of said spindle and tending to move said tension blocks and thus also said levers at the opposite sides of both pairs of disks toward each other so as to tighten said driving element, nutlike members screwed on said screw threads of said spindle and each adapted to engage with the outer side of one of said tension blocks, and means for continuously producing a torque for turning said nutlike members and said spindle relative to each other so as to move said nutlike members for the distance of the tightening movement of said tension blocks caused by said spring means and merely into bracing engagement with the outer sides of said tension blocks.

3. A tightening mechanism as defined in claim 2, further comprising abutments secured to said spindle at the outer sides of said pair of tension blocks, said spring means each acting at one side upon the outer side of one of said tension blocks and at the other side upon one of said abutments.

4. A tightening mechanism as defined in claim 2, in which said nutlike members are cup-shaped, and further comprising abutments secured to said spindle in front of the screw threads thereon and within said nutlike members, said spring means each acting at one side upon the outer side of one of said tension blocks and at the other side upon one of said abutments.

5. A tightening mechanism as defined in claim 2, further comprising abutments secured to said spindle behind the screw threads thereon, each of said nutlike members having at least one aperture, a pin passing slidably through said aperture and having one end adapted to engage with one of said tension blocks, said spring means acting at one side upon the other end of said pin and at the other side upon said abutment.

6. A tightening mechanism as defined in claim 2, further comprising abutments on said housing at the outer sides of said tension blocks, said spring means each acting at one side upon the outer side of one of said tension blocks and at the other side upon one of said abutments.

7. A tightening mechanism as defined in claim 2, in which said spring means comprise at least one tension spring connected to both tension blocks and tending to draw them toward each other.

8. A tightening mechanism as defined in claim 2, further comprising a shaft rotatably mounted in said tension blocks, a pinion secured to each end of said shaft, an outer gear rim on each of said nutlike members and each in mesh with one of said pinions, said torque-producing means comprising at least one torsion spring acting upon said shaft and tending to turn the same and, through said pinions and said gear rims, said nutlike members until said members engage with said tension blocks.

9. A tightening mechanism as defined in claim 2, further comprising an arm secured to and projecting from each of said nutlike members, said torque-producing means comprising spring means, acting upon said arms to turn said nutlike members until they engage with said tension blocks.

10. A tightening mechanism as defined in claim 2, in which said spindle is rotatably mounted and said nutlike members are nonrotatably mounted, and an arm secured to and projecting from said spindle, said torque-producing means comprising spring means acting upon said arm and tending to turn said spindle relative to said nutlike members so as to move said members into engagement with said tension blocks.

11. A tightening mechanism as defined in claim 2, in which said screw threads of said nutlike members and the associated screw threads on said spindle are sawtooth shaped.

12. A tightening mechanism as defined in claim 2, in which the contact surfaces of said nutlike members facing said tension blocks and the corresponding contact surfaces of said tension blocks are roughened so as to interengage with each other when said nutlike members are moved into engagement with said tension blocks.

References Cited by the Examiner

UNITED STATES PATENTS 3,097,540  7/63  Berens.
3,136,169  6/64  Karger et al.
3,138,033  6/64  Glasson et al.

DON A. WAITE, *Primary Examiner.*